US008851240B1

(12) United States Patent
Scoggins

(10) Patent No.: US 8,851,240 B1
(45) Date of Patent: Oct. 7, 2014

(54) WHEEL CHOCK AND METHOD

(76) Inventor: Tommy G. Scoggins, Burlington, NC (US)

(*) Notice: Subject to any disclaimer, the term of this patent is extended or adjusted under 35 U.S.C. 154(b) by 77 days.

(21) Appl. No.: 13/473,737

(22) Filed: May 17, 2012

(51) Int. Cl.
*B60T 3/00* (2006.01)

(52) U.S. Cl.
USPC .............................................. 188/32; 410/30

(58) Field of Classification Search
CPC .............. B60T 3/00; B60P 3/077; B64F 1/16; E01C 11/221; E01C 11/222
USPC ................. 188/4 R, 5, 6, 7, 23, 32; D12/217; 410/20, 30; 174/101; 404/7; 411/185, 411/409; 52/295, 297, 296, 298, 294
See application file for complete search history.

(56) References Cited

U.S. PATENT DOCUMENTS

| | | | | |
|---|---|---|---|---|
| 1,757,866 A * | 5/1930 | Johnson | ......................... | 410/30 |
| 3,438,417 A * | 4/1969 | Albris | ........................... | 411/185 |
| 3,547,228 A * | 12/1970 | Wiley | ............................. | 188/32 |
| 4,653,967 A * | 3/1987 | Isaksson et al. | ................ | 410/49 |
| 4,762,438 A * | 8/1988 | Dewing | ............................. | 404/6 |
| 4,917,219 A | 4/1990 | Henry | ............................. | 188/32 |
| 4,979,856 A * | 12/1990 | Blunden et al. | ................... | 410/9 |
| 5,267,367 A * | 12/1993 | Wegmann, Jr. | ................ | 14/69.5 |
| 5,465,814 A | 11/1995 | Ziaylek | ........................... | 188/32 |
| D432,976 S * | 10/2000 | Chiang | ......................... | D12/217 |
| 6,454,181 B1 * | 9/2002 | Griffith | ......................... | 238/315 |
| 6,494,651 B1 * | 12/2002 | Zhan et al. | ..................... | 410/116 |
| 6,648,103 B2 * | 11/2003 | Scheffer | ........................... | 188/32 |
| 7,004,696 B2 * | 2/2006 | Anderson et al. | ............... | 410/30 |
| 7,040,461 B2 | 5/2006 | Chrisco et al. | .................. | 188/32 |
| 7,145,078 B2 * | 12/2006 | Henry | ........................... | 174/101 |
| 7,299,902 B2 * | 11/2007 | Thorpe | ........................... | 188/32 |
| D633,850 S * | 3/2011 | Morin | .......................... | D12/217 |
| 7,939,759 B2 * | 5/2011 | Henry | ........................... | 174/68.1 |
| 2007/0116514 A1 * | 5/2007 | Woytowich et al. | .............. | 404/7 |
| 2008/0128220 A1 | 6/2008 | Hartmann | ....................... | 188/32 |
| 2009/0195002 A1 * | 8/2009 | Meyers | ........................... | 293/122 |

OTHER PUBLICATIONS

Pending U.S. Appl. No. 13/159,644, filed Jun. 14, 2011; For: Threshold and Lag Assembly for a Door.

* cited by examiner

*Primary Examiner* — Bradley King
*Assistant Examiner* — Stephen Bowes
(74) *Attorney, Agent, or Firm* — Blake P. Hurt

(57) ABSTRACT

A wheel chock and method for stopping the rotation of a wheel including a U-shaped member and a pair of downwardly depending flanges, each of the pair of flanges attached to opposite sides of the U-shaped member and extending outwardly therefrom. Each of the flanges has a width shorter than the vertical height of the U-shaped member. While most wheel chocks either move when subject to sufficient horizontal force or are permanently fixed to a surface, this chock is designed with a removable lag assembly to secure the chock from inadvertent displacement but can be removed and transported for wheel security at another destination.

17 Claims, 7 Drawing Sheets

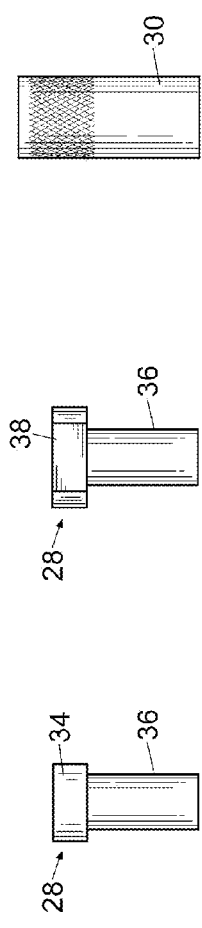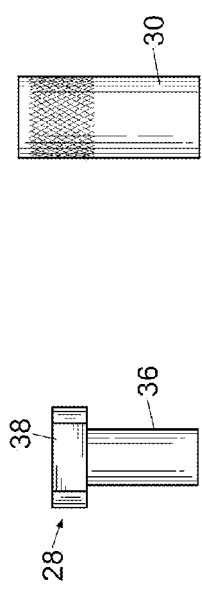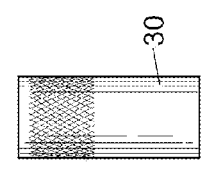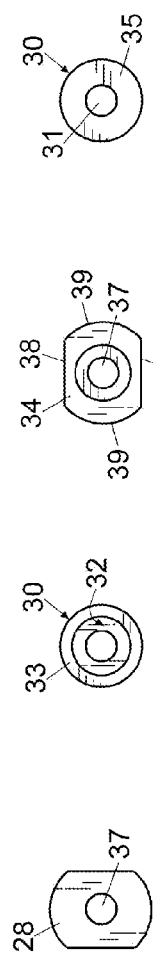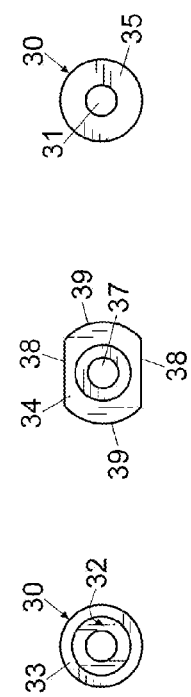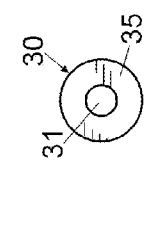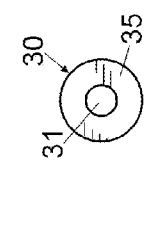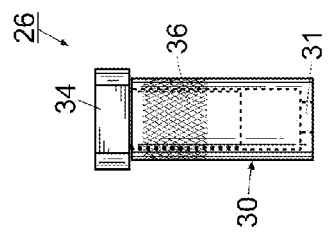

WHEEL CHOCK AND METHOD

FIELD OF THE INVENTION

The invention herein pertains to chocks for vehicle wheels and particularly pertains to wheel chocks that are affixed to a substrate with a fastener that can be quickly and easily removed for transportation for use in another location.

DESCRIPTION OF THE PRIOR ART AND OBJECTIVES OF THE INVENTION

Wheel chocks generally are known in the art, as shown in U.S. Pat. Nos. 7,040,461, 5,465,814, and 4,917,219. These chocks and others come in multiple configurations and designs, but they are all intended to stop the rotation of a vehicle wheel. Integral features of the wheel chock include is its structural stability and resistance to horizontal force, as wheel rotation cannot be stopped if the chock is displaced. Therefore, it is desirable to affix the chock to the ground or other surface to prevent undesired rotation of the vehicle wheel. However, it is also desirable for the owners of recreational vehicles such as boats, camper trailers, motorcycles, or the like to transport chocks so that trailers and vehicles will be secure at their respective destination. There are also chocks known in the art such as shown in U.S. Patent Application Publication No. 2008/0128220 that seek the same outcome by surrounding the vehicle wheel. This design also suffers from drawbacks, as the design is limited in the number of wheel configurations it is compatible with due to tire size or width and further such a design may cause substantial damage to a vehicle in the event that the vehicle operator misjudges the position of the chocks.

Thus, in view of the problems and disadvantages associated with prior art devices, the present invention was conceived and one of its objectives is to provide a wheel chock that can be securely fastened to the ground.

It is another objective of the present invention to provide a wheel chock with a pair of downwardly depending flanges attached to an elongated U-shaped member.

It is still another objective of the present invention to provide a wheel chock with a pair of flanges having a width shorter than the vertical height of the U-shaped member.

It is yet another objective of the present invention to provide a wheel chock with flanges that extend at an acute angle of about 30-60° from the U-shaped member.

It is a further objective of the present invention to provide a wheel chock with a plurality of braces contiguous with the pair of flanges.

It is still a further objective of the present invention to provide a wheel chock that is formed from a rigid material such as a polymeric material or metal.

It is yet a further objective of the present invention to provide a wheel chock that has a lag assembly.

It is yet another objective of the present invention to provide a lag assembly including a bolt and a knurled sleeve.

It is a further objective of the present invention to provide a bolt with a head having two opposing flat sides and two opposing arcuate sides.

It is still a further objective of the present invention to provide a method for preventing inadvertent rotation of vehicle wheels.

It is yet another objective of the present invention to provide a wheel chock that may be transported and used to secure vehicle wheels at a distant destination.

It is yet still another objective of the present invention to provide a wheel chock which will remain upright and is not distorted as vehicle wheels repeatedly pass thereover.

It is a further objective of the present invention to provide an inexpensive and easy to install system to secure vehicle wheels.

Various other objectives and advantages of the present invention will become apparent to those skilled in the art as a more detailed description is set forth below.

SUMMARY OF THE INVENTION

The aforesaid and other objectives are realized by providing a wheel chock for stopping inadvertent rotation of parked vehicle wheels including an elongated U-shaped member and a pair of opposing downwardly depending flanges. Each of the pair of flanges is attached to opposite sides of the U-shaped member and extend outwardly therefrom. Each of the pair of flanges has a width shorter than the vertical height of the U-shaped member. The chock is held in place through elongated apertures in the base of the U-shaped member with a lag assembly that includes a sleeve and a bolt having a head defined by two flat sides and two arcuate sides. The sleeve is placed in a pre-drilled hole in a substrate and when the chock and its apertures are positioned above the sleeve and in proximity to a vehicle wheel, the bolt is inserted and positioned within the bore defined by the sleeve for preventing substantial rotation of the vehicle wheel.

A method of preventing inadvertent movement of a parked vehicle including the steps of providing a first wheel chock having an elongated U-shaped member with holes in the base, a pair of opposing downwardly depending flanges, each of the pair of flanges attached to opposite sides of the U-shaped member and extending outwardly therefrom, and each of the pair of flanges having a width shorter than the vertical height of said U-shaped member to terminate wheel rotation. The method further includes the step of placing the first wheel chock proximate a wheel of the vehicle to prevent the wheel from rotating.

BRIEF DESCRIPTION OF THE DRAWINGS

FIG. 7A demonstrates a right side elevational view of the bolt of the lag assembly, the left side elevational view being a mirror image thereof;

FIG. 7B shows the front elevational view of the bolt, the rear elevational view being a mirror image thereof;

FIG. 7C illustrates a side elevational view of the sleeve of the lag assembly for receiving the bolt in FIG. 7A, with all sides of the sleeve being identical;

FIG. 7D features a top plan view of the bolt presented in FIG. 7A;

FIG. 7E pictures a top plan view of the sleeve shown in FIG. 7C;

FIG. 7F shows a bottom plan view of the bolt in FIG. 7B;

FIG. 7G illustrates a bottom plan view of the sleeve in FIG. 7C; and

FIG. 7H shows a front elevational view of the lag assembly comprising a bolt in a sleeve, the rear elevational view of the bolt and sleeve being a mirror image thereof.

DETAILED DESCRIPTION OF THE PREFERRED EMBODIMENT AND OPERATION OF THE INVENTION

Figure 1:
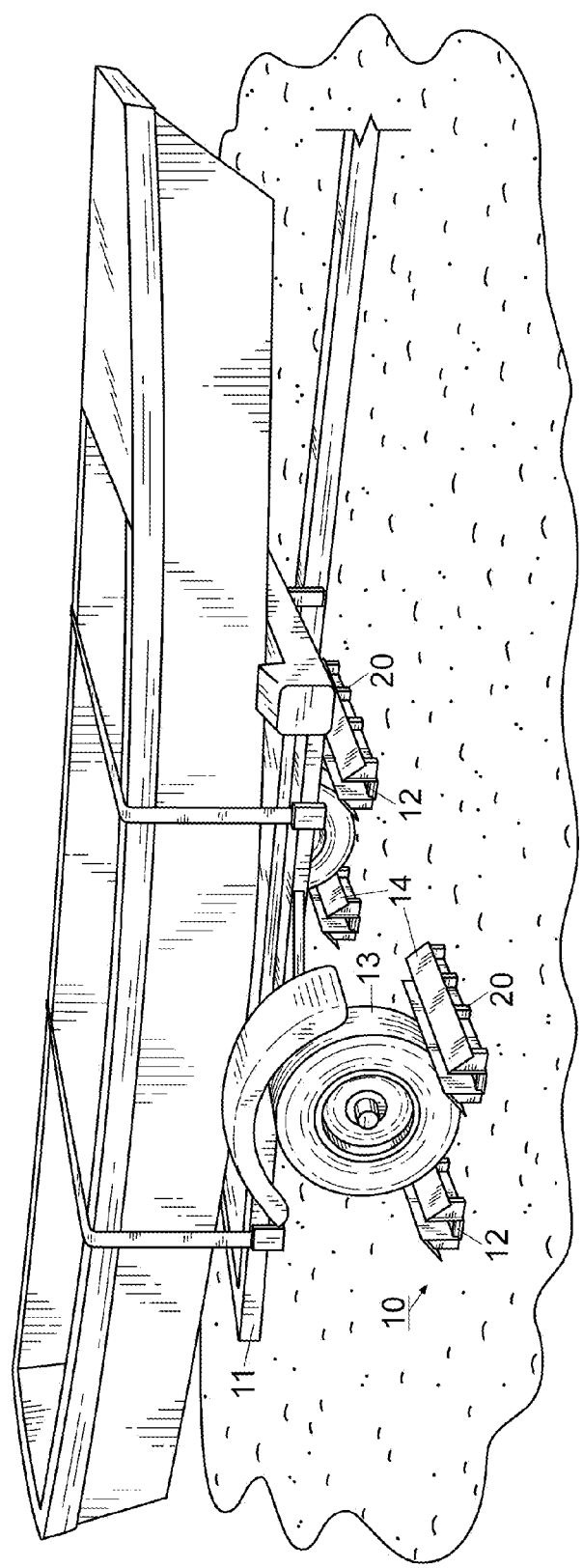
FIG. 1 shows a perspective view of a schematic representation of a boat trailer with a pair of wheel chocks in position to secure each of the wheels.
Figure 2:
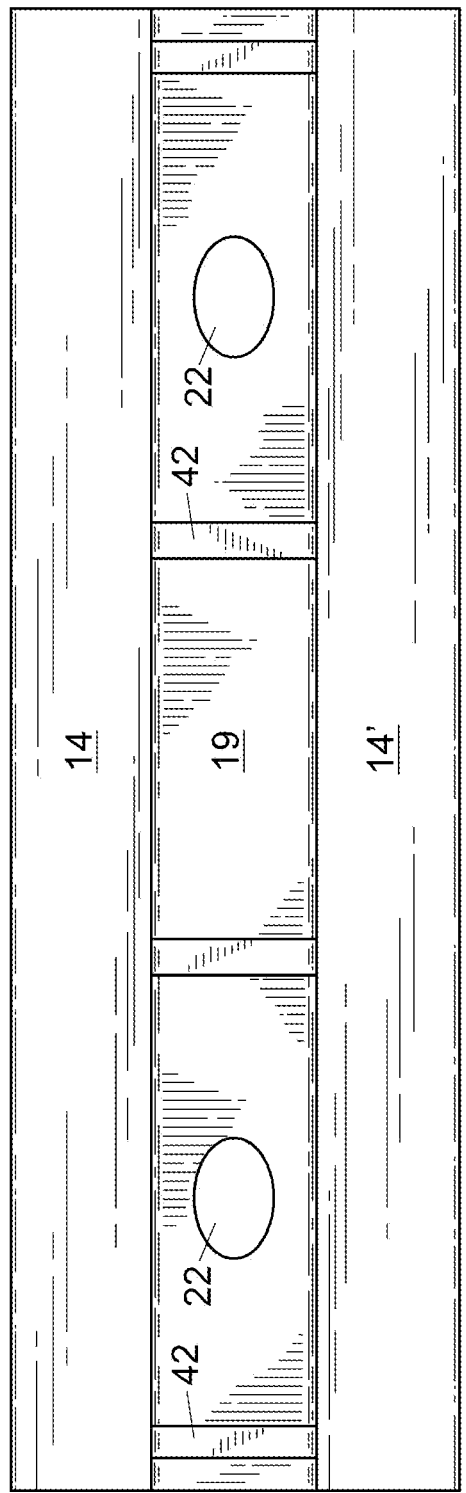
FIG. 2 pictures a top plan view of the wheel chock shown in FIG. 1.
Figure 3:
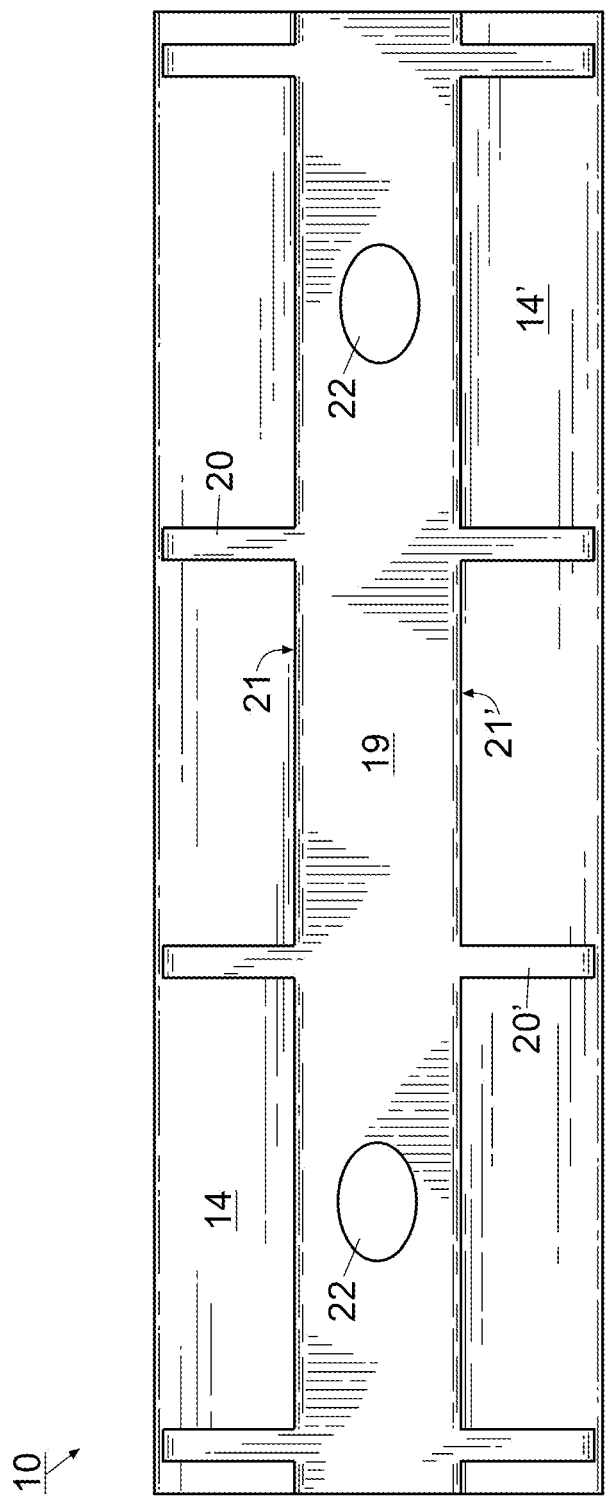
FIG. 3 depicts a bottom plan view of a wheel chock as shown in FIG. 2.
Figure 4:
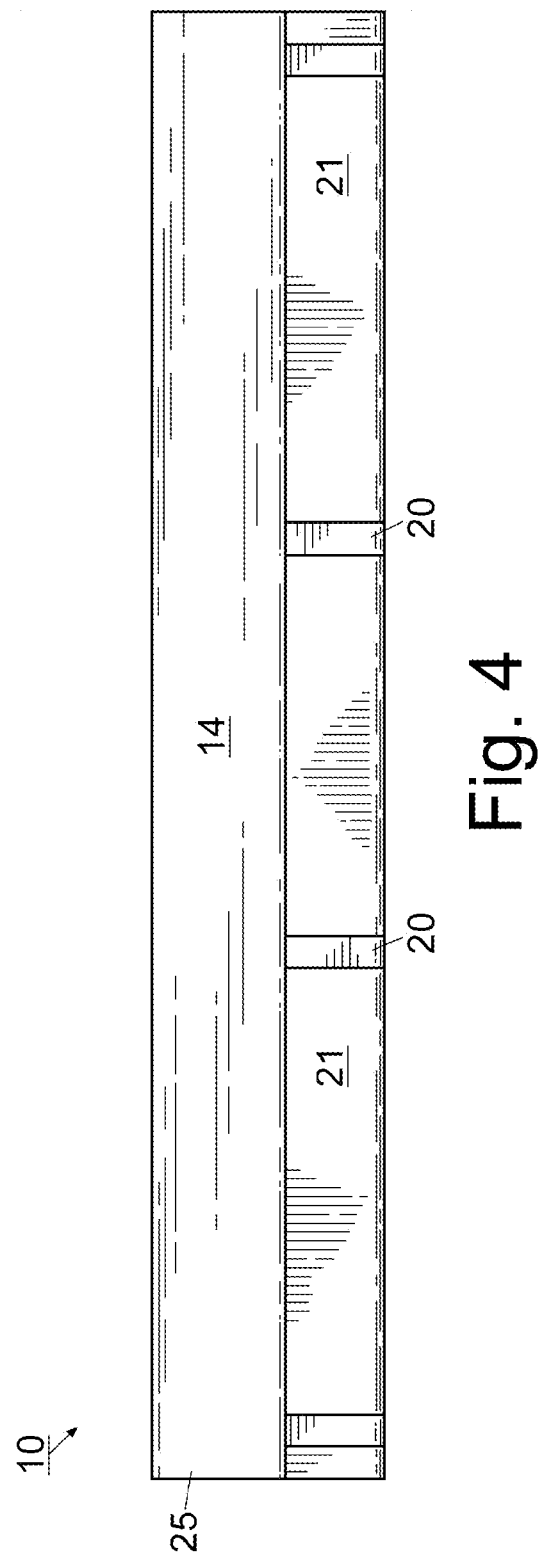
FIG. 4 demonstrates a right side elevational view of a wheel chock prior to attachment to a substrate, the left side elevational view being a mirror image thereof.
Figure 5:
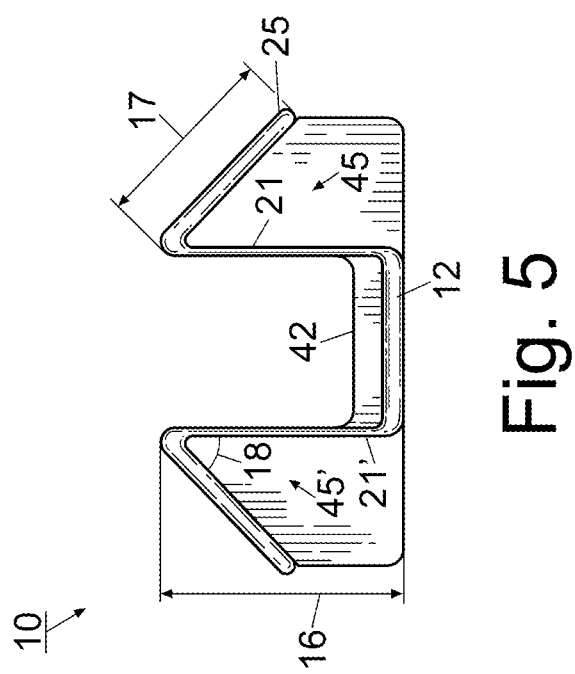
FIG. 5 illustrates an enlarged end view of the wheel chock seen in FIG. 1 with height and width lines included.
Figure 6:
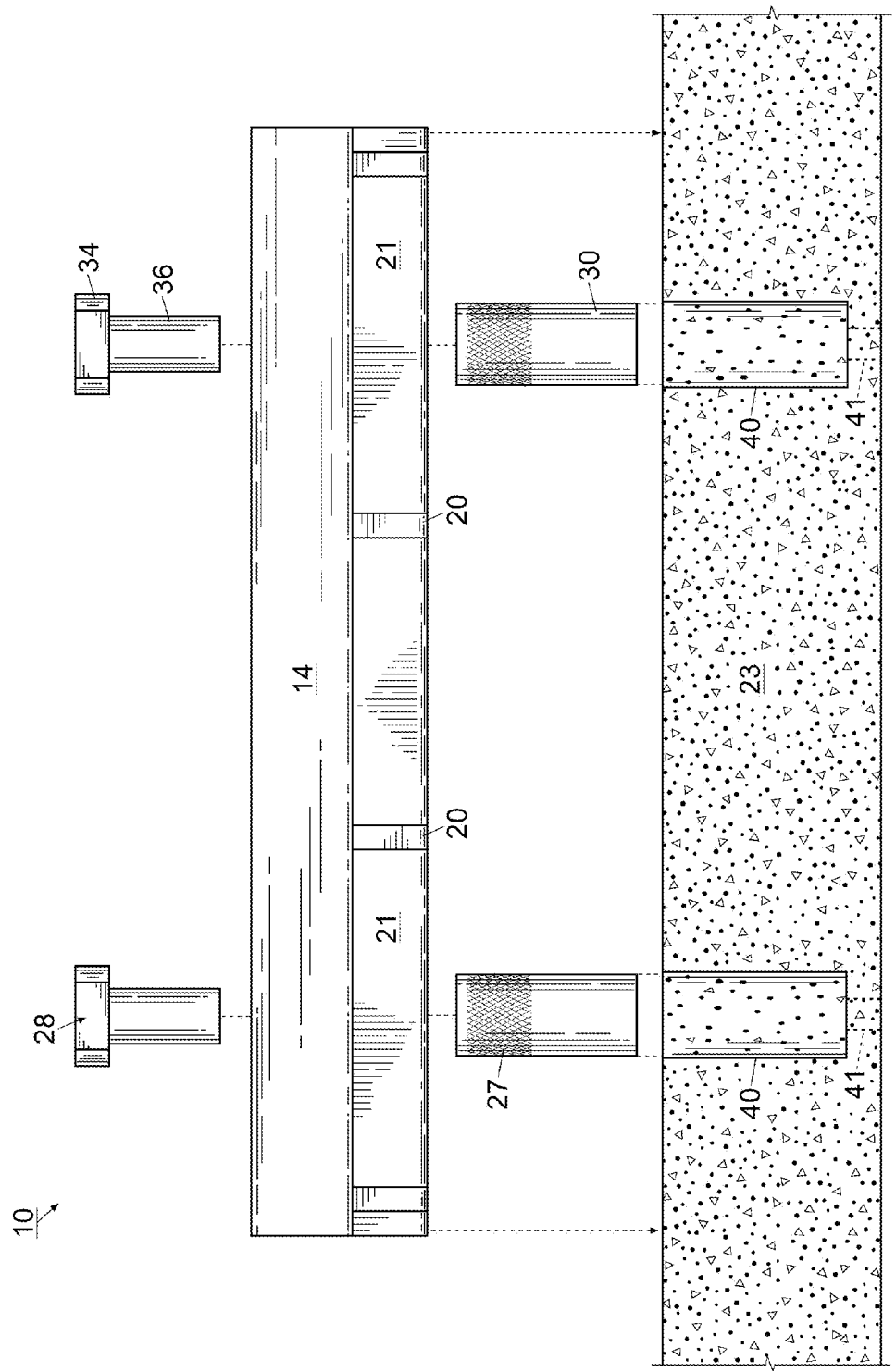
FIG. 6 features an exploded right side elevational view of a schematic of the wheel chock of FIG. 1 with a bolt and sleeve of a lag assembly prior to installation, the left side elevational view of the wheel chock and lag assembly being a mirror image thereof.

For a better understanding of the invention and its operation, turning now to the drawings, FIG. 1 shows a perspective view of a schematic representation of trailer 11 with a pair of wheel chocks 10 in position to secure each of wheels 13. Preferred wheel chock 10 provides a secure stop for vehicle wheels such as trailer wheels 13 by affixing wheel chocks 10 (FIGS. 2-6) with lag assembly 26 (FIGS. 7A-7H) to a substrate therebeneath such as a concrete slab. Preferred wheel chock 10 includes elongated U-shaped member 12 of approximately eighteen (18) inches (45.72 cm) in length although other lengths may be manufactured as desired. Preferred U-shaped member 12 includes base 19 (FIG. 3) of about one and one-half (1½) inches (3.81 cm) in width with opposing, spaced parallel vertical sides 21, 21' (FIGS. 3 and 5), each with a height of approximately two (2) inches (5.08 cm) attached thereto. Downwardly depending flanges 14, 14' (FIGS. 2 and 5) are affixed respectively to the top of sides 21, 21' and have a width of approximately one and three quarter (1¾) inches (4.45 cm) each. Base 19 is planar along the bottom thereof as seen in FIGS. 3 and 4 and includes a pair of apertures 22 (FIGS. 2-3) therein for receiving bolt 28 to affix chock 10 to a substrate such as concrete floor 23 as shown in FIG. 6. Base 19 further includes a plurality of ribs 42 on the inside thereof between sides 21, 21' as seen in FIG. 2. Ribs 42 are in alignment with braces 20, 20' for added structural integrity to prevent sides 21, 21' from folding in on each other due to repeated impact with vehicle wheels. Chock 10 may be integrally formed as by molding, bending, extruding or other conventional metal forming techniques but is preferably formed from fourteen (14) gauge steel which may be plated, powder coated in various colors or other standard suitable coating processes can be used.

Chock 10 includes a plurality of opposing polygon shaped flange braces 20, 20' as seen in FIGS. 3 and 4 spaced along respective sides 21, 21'. Braces 20, 20' have four (4) sides and support and maintain flanges 14, 14' respectively at an outwardly extending angle of approximately 30-60°, preferably 40°, from sides 21, 21' as seen in FIGS. 1, 4 and 5 forming exterior cavities 45, 45' therebetween. Braces 20, 20' may be rigidly joined respectively such as by welding to sides 21, 21' and preferably contiguous (and not rigidly affixed) to flanges 14, 14' for added integrity to wheel chock 10. By utilizing braces 20, 20' chock 10 has sufficient structural integrity to withstand a vehicle such as a loaded trailer as in FIG. 1 passing repeatedly thereover without damage or distortion thereto. Wheel chock 10 may also be formed from polymeric or other suitable rigid materials.

FIG. 2 pictures a top plan view of wheel chock 10 while FIG. 3 depicts a bottom plan view of wheel chock 10. U-shaped member 12 has a preferred internal width of about one and one half (1½) inches (3.81 cm) for allowing apertures 22 and lag assembly 26 sufficient space for a user to manually secure chock 10 to a given substrate. Aperture 22 is preferably an elongated shape such as an oval to accommodate discrepancies in measurement during installation of lag assembly 26 and particularly sleeve 30 which receives bolt 28. Without this tolerance, a user of chock 10 would be forced to repeatedly drill hole 40 (FIG. 6) for sleeve 30 if the alignment with aperture 22 was even marginally incorrect. FIGS. 7C, 7E and 7G display sleeve 30 that defines bore 32 therein which is manufactured to have a diameter approximate the diameter of bolt shaft 36 which is preferably 7/16 of an inch (1.111 cm) to form a secure engagement such as seen in FIG. 7H. Sleeve 30 further includes upper shoulder 33 (FIG. 7E) which abuts bolt head 34 as seen in FIG. 7H and an opposing lower shoulder 35 (FIG. 7G) having opening 31 therein. Shoulder 33 restricts bore 32 to a circular opening that allows air and moisture to flow downwardly, out of opening 31 at the bottom of sleeve 30 instead of being trapped therein.

FIG. 4 demonstrates a right side elevational view of wheel chock 10 prior to attachment to a substrate, the left side elevational view of wheel chock 10 being a mirror image. Flange 14 is made of flat planar member 25 (FIG. 5) that contacts a vehicle wheel such as wheel 13 shown in FIG. 1. FIG. 5 illustrates an enlarged end view of wheel chock 10 for demonstration. Preferably, flange 14 extends outwardly and downwardly from U-shaped member 12 at acute angle 18 which preferably is approximately 40°. Conventional wheel chocks often define a vertical or substantially vertical face that causes significant jarring to the vehicle and vehicle wheel when contacted. Such jarring often leads to damage, for example by damaging the suspension of a car or dislodging valuable cargo stored on a trailer (not shown). As would be understood from this FIGS. 1 and 5, flange 14 directly contacts wheel 13, terminating rotation of the wheel in the direction of chock 10. Without width 17 of flange 14 being shorter than the height 16 of U-shaped member 12, flange 14 would serve as a ramp instead of a wheel stop and would not sufficiently terminate wheel rotation. The 40° angle also results in a lessened impact when contacting chock 10 which will avoid some of the jarring and damage produced by other wheel chocks while simultaneously providing tactile feedback to the vehicle user upon contact.

A right side elevational view of a schematic of wheel chock 10 prior to attachment to concrete floor 23 is featured in FIG. 6. Lag assembly 26 (FIG. 7H) is made up of bolt 28 and sleeve 30 which defines bore 32 (FIG. 7E). Sleeve 30 may have knurled finish 27 on the outside thereof as shown in FIGS. 6, 7C and 7H and can be inserted into pre-drilled hole 40 prior to insertion of bolt 28 which comprises conventional lag bolt shaft 36 affixed to bolt head 34. Conventional bolts have circular or regular polygonal heads but bolt head 34 includes a pair of opposing flat sides 38 (FIGS. 7B and 7F) connected by opposing arcuate sections 39 (FIGS. 7A, 7D and 7F) which assist the grip of a user during manual insertion into or removal of bolt 28 from sleeve 30. As would be understood, wheel chock 10 can be repositioned after extracting bolts 28.

FIG. 7A shows a side elevational view of bolt 28 used in attaching wheel chock 10 to a substrate such as concrete floor 23. Flat side 38 as seen in FIG. 7B greatly assists a user with inserting and removing bolt 28 from sleeve 30, especially when bolt head 34 is wet or otherwise difficult to manually grasp. While flat sides 38 assist in gripping bolt head 34, arcuate sections 39 complete bolt head 34 and prevent it from having angular or sharp corners that could damage chock 10 as well as injure a potential user. FIG. 7D features a top plan view of bolt 28 while FIG. 7F shows a bottom plan view thereof. These views display bolt head 34 and clearly illustrate flat sides 38 and arcuate sections 39.

FIG. 7C illustrates a side elevational view of sleeve 30 for receiving bolt 28 shown in FIG. 7A. Sleeve 30 defines bore 32 that preferably has an inner diameter of ¾ of an inch (1.905 cm) and runs almost the entire longitudinal length of sleeve 30 as seen in FIG. 7H. Sleeve 30 may be machined such that bore 32 can accommodate the diameter of bolt shaft 36. Although only one side of sleeve 30 is presented, it is understood that all sides of sleeve 30 appear the same. A top plan view of sleeve 30 is shown in FIG. 7E with bore 32 shown with shoulder 33 therearound. FIG. 7G illustrates a bottom plan view of sleeve 30 which defines bottom shoulder 35 having a small opening 31 therein that allows for the release of fluids from the bottom of sleeve 30.

FIG. 7H shows an elevational view of bolt 28 engaged with sleeve 30. Bolt 28 may include a solid bolt shaft 36 but preferably further includes central channel 37 (FIGS. 7D and 7F) which extends the longitudinal length of bolt 28. Additional components may be used in the event a user wishes to permanently affix chock 10 to a substrate, for example by driving a fastener (not shown) through central channel 37 of bolt 28 and pre-drilled holes 41 shown extending below pre-drilled holes 40 in FIG. 6 or by attaching bolt 28 to sleeve 30 or adhering bolt 28 to sleeve 30 with an adhesive (not shown) such as cement.

The preferred method of using wheel chock 10 to prevent inadvertent movement of a parked vehicle includes the step of providing first wheel chock 10 having elongated U-shaped member 12 with elongated aperture 22, a pair of opposing downwardly depending flanges 14, 14', each of flanges 14, 14' attached to respectively opposing sides 21, 21' of U-shaped member 12 and extending downwardly and outwardly therefrom, and each of flanges 14, 14' having a width 17 shorter than vertical height 16 of U-shaped member 12. Further providing lag assembly 26 comprising bolt 28 having head 34 with a pair of opposing flat sides 38 and pair of opposing arcuate sections 39, and sleeve 30 defining bore 32. The method includes the step of pre-drilling holes 40 in a substrate such as concrete floor 23 shown in FIG. 6 of sufficient size for inserting sleeve 30 into hole 40. Thereafter aligning wheel chock 10 so that elongated apertures 22 are substantially over pre-drilled holes 40, inserting lag bolts 28 through apertures 22 and within bores 32 of sleeves 30. Thereafter positioning a vehicle wheel against flange 14 of wheel chock 10 to prevent the wheel from rotating and placing a second wheel chock 10 proximate the vehicle wheel in opposing relation to the first wheel chock 10.

After installation wheel chock 10 is prepared for use and is capable of withstanding significant horizontal force while securing vehicle wheels and preventing inadvertent wheel rotation. If chock 10 is only needed as a temporary wheel restraint, bolt 28 may be removed or not included in the installation process. In such cases, chock 10 is still able to prevent inadvertent rotation of vehicle wheels but may also be transported, for example when a boat and trailer are taken to the lake. In such a case, chock 10 may be used to secure the trailer after the boat is launched but need not be affixed with the use of bolt 28.

The illustrations and examples provided herein are for explanatory purposes and are not intended to limit the scope of the appended claims.

I claim:

1. A wheel chock comprising:
   an elongated U-shaped member defining a vertical height, said U-shaped member defining an elongated aperture,
   a lag assembly, said lag assembly contained within said aperture,
   a pair of opposing downwardly depending flanges, each of said pair of flanges attached to opposite sides of said U-shaped member and extending outwardly at an acute angle therefrom, and each of said pair of flanges having a lateral width shorter than the vertical height of said U-shaped member such that said flanges do not contact a substrate therebeneath, forming an exterior cavity along each side of said U-shaped member,
   at least one outwardly-facing vertical brace, each brace being contiguous to one of said pair of flanges,
   said lag assembly comprising a sleeve and a bolt, said sleeve defining a bore sized to receive said bolt, said bolt positioned within said bore, whereby said bolt of said lag assembly can be inserted through said elongated aperture to removably attach said wheel chock to said substrate, and
   wherein said flanges and said exterior cavities permit a wheel to selectively pass over said chock when sufficient force is applied.

2. The wheel chock of claim 1 wherein each of said pair of flanges extend at an angle of about 30-60° from said U-shaped member.

3. The wheel chock of claim 1 wherein each of said pair of flanges extend at an angle of about 40° from said U-shaped member.

4. The wheel chock of claim 1, the at least one brace further comprises a plurality of braces, each of said plurality of braces contiguous to one of said pair of flanges.

5. The wheel chock of claim 1 wherein said U-shaped member is formed from a rigid material.

6. The wheel chock of claim 5 wherein said rigid material comprises a metal.

7. The wheel chock of claim 5 wherein said rigid material comprises a polymeric material.

8. The lag assembly of claim 1 wherein said bolt comprises a head and a shaft, said shaft joined to said head, said head defining a pair of flat sides and a pair of arcuate sides, said flat sides positioned in opposing relation on said head, said arcuate sides positioned in opposing relation on said head, said flat and arcuate sides oriented parallel said shaft.

9. The wheel chock of claim 1 wherein said aperture is ovular.

10. The wheel chock of claim 1 wherein said sleeve defines a knurled exterior surface.

11. The wheel chock of claim 1 wherein said sleeve defines top and bottom shoulders, said bottom shoulder defining an opening, whereby said opening allows drainage out of said sleeve.

12. A wheel chock for a vehicle tire comprising: a first section, said first section comprising an elongated rigid U-shaped member, said U-shaped member comprising a base and a pair of parallel spaced upright sides, a pair of rigid flanges, each of said pair of flanges joined to different ones of said pair of sides, and each of said pair of flanges extending outwardly from said U-shaped member at an acute angle therefrom, each of said pair of flanges having a lateral width shorter than the vertical height of said U-shaped member such that said flanges do not contact a substrate therebeneath, forming an exterior cavity along each side of said U-shaped member, said base defining an elongated aperture, at least one outwardly-facing vertical brace, each brace being contiguous to one of said pair of flanges, a lag assembly, said lag assembly positioned in said elongated aperture to removably attach said wheel chock to said substrate, said lag assembly comprises a bolt, a sleeve, said bolt received within said sleeve, said bolt comprises a head and a shaft, said shaft joined to said head, said head defining a pair of flat sides and a pair of arcuate sides, said flat sides positioned in opposing relation on said head, said arcuate sides positioned in opposing relation on said head, said flat and arcuate sides oriented parallel said shaft, wherein said flanges and said exterior cavities permit a wheel to selectively pass over said chock when sufficient force is applied.

13. A method of preventing inadvertent movement of a parked vehicle comprising the steps of:
 a) providing a first wheel chock, the wheel chock comprising:
  an elongated U-shaped member defining a vertical height, said U-shaped member defining an elongated aperture,
  a lag assembly, said lag assembly contained within said aperture,
  a pair of opposing downwardly depending flanges, each of said pair of flanges attached to opposite sides of said U-shaped member and extending outwardly at an acute angle therefrom, and each of said pair of flanges having a lateral width shorter than the vertical height of said U-shaped member such that said flanges do not contact a substrate therebeneath, forming an exterior cavity along each side of said U-shaped member,
  at least one outwardly-facing vertical brace, each brace being contiguous to one of said pair of flanges,
  said lag assembly comprising a sleeve and a bolt, said sleeve defining a bore sized to receive said bolt, said bolt positioned within said bore, whereby said bolt of said lag assembly can be inserted through said elongated aperture to removably attach said wheel chock to said substrate, and
  wherein said flanges and said exterior cavities permit a wheel to selectively pass over said chock when sufficient force is applied; and
 b) placing the first wheel chock proximate the wheel of the vehicle to prevent the wheel from rotating.

14. The method of claim 13 further comprises the step of placing a second wheel chock proximate the wheel in opposing relation to said first wheel chock.

15. The method of claim 13 wherein the step of placing the first wheel chock comprises the step of fastening the first wheel chock to the substrate.

16. The method of claim 15 wherein fastening the first wheel chock comprises the step of fastening the first wheel chock with the lag assembly.

17. The method of claim 13 further comprising the steps of:
 a) pre-drilling a hole in the mounting substrate;
 b) inserting the sleeve into the predrilled hole;
 c) aligning the elongated aperture with the pre-drilled hole; and
 d) inserting the bolt through the elongated aperture and into the sleeve within the pre-drilled hole.

\* \* \* \* \*